United States Patent [19]

Doussoux

[11] 4,002,844

[45] Jan. 11, 1977

[54] DEVICE FOR MULTIPLEXING N ASYNCHRONOUS DIGITAL TRAINS

[75] Inventor: Pierre Doussoux, Paris, France

[73] Assignee: Compagnie Industrielle des Telecommunications Cit-Alcatel, Paris, France

[22] Filed: Mar. 19, 1975

[21] Appl. No.: 560,010

[30] Foreign Application Priority Data

Apr. 25, 1974 France .............................. 74.14460

[52] U.S. Cl. ........................................... 179/15 AF
[51] Int. Cl.² .......................................... H04J 3/06
[58] Field of Search ...... 179/15 AF, 15 BS, 15 BY; 178/69.5 R

[56] References Cited

UNITED STATES PATENTS

| | | | |
|---|---|---|---|
| 3,093,815 | 6/1963 | Karnaugh | 340/173 |
| 3,569,631 | 3/1971 | Johannes | 179/15 AF |
| 3,749,839 | 7/1973 | Fornasier | 179/15 AF |

OTHER PUBLICATIONS

Note, Recensioni e Notizie; vol. XIX, No. 5, pp. 629–649; "Second Order Multiplexing of PCM Telephone Systems".

Primary Examiner—David L. Stewart
Attorney, Agent, or Firm—Sughrue, Rothwell, Mion, Zinn & Macpeak

[57] ABSTRACT

The invention comes within the field of multiplex digital transmissions. It concerns a device for multiplexing $n$ digital asynchronous trains into a more rapid digital train, comprising $n$ channel elements for synchronizing together the asynchronous trains by adding of extra bits called "justification bits" and a multiplexing element for sending out, from the synchronized trains, the rapid multiplex train. According to the invention, each of the channel elements comprises means for inserting, at a determined location place in the corresponding synchronized train, a justification request signal, the said multiplexing element comprising means for reading each of the $n$ justification request signals and controlling the insertion in the multiplex train of justification indicator bits and means for giving, if required, to the corresponding channel element, the permission to effect a justification.

2 Claims, 5 Drawing Figures

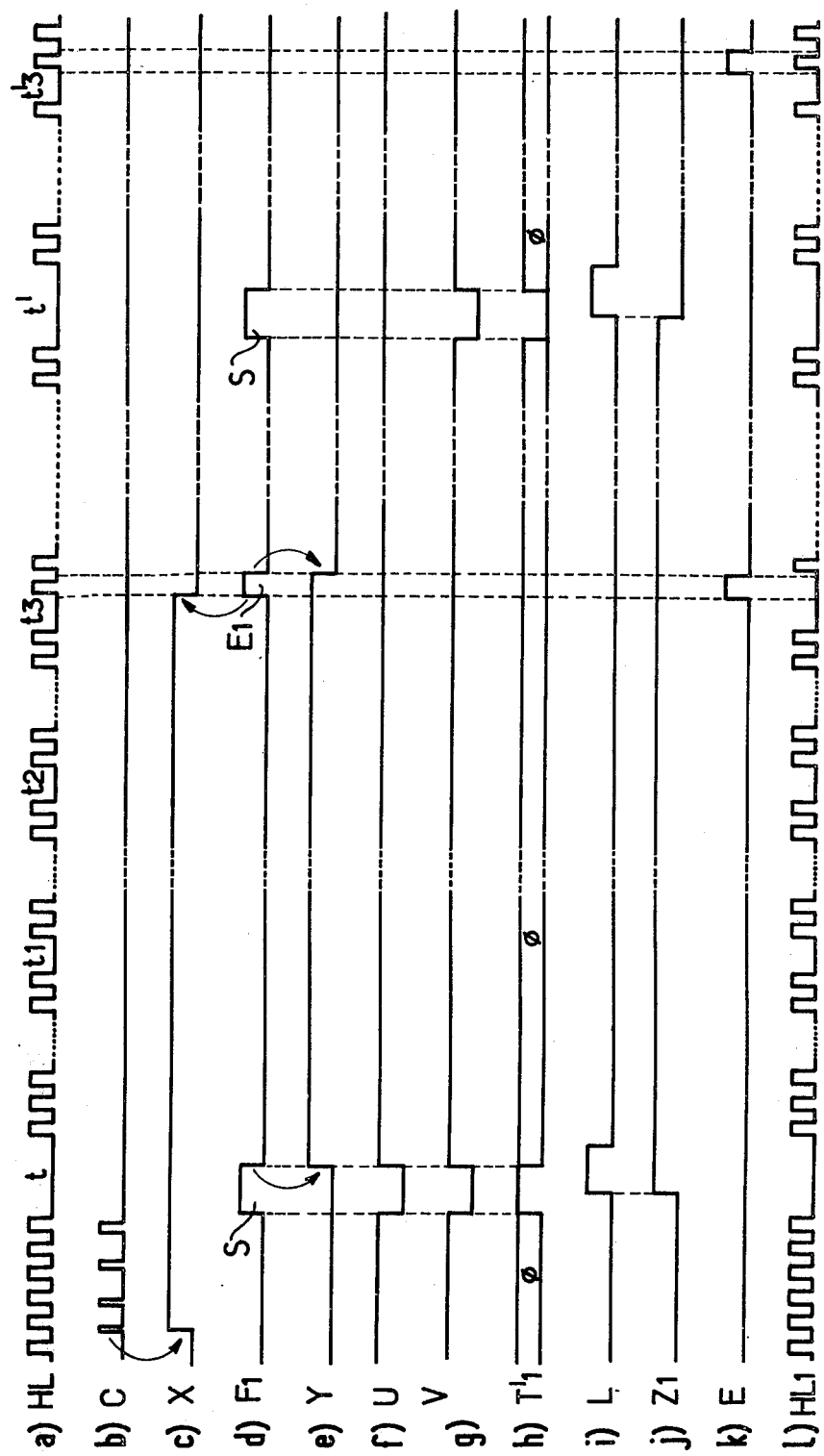

DEVICE FOR MULTIPLEXING N ASYNCHRONOUS DIGITAL TRAINS

BACKGROUND OF THE INVENTIONS

The present invention comes within the field of digital transmissions.

It concerns a digital multiplexing device.

The principle of digital multiplexing is known : $n$ digital trains having a given pulse rate and carried by $n$ channels called in-coming channels are multiplexed in time into a single trains having a higher pulse rate and carried by a channel called the out-going channel. To effect that multiplexing operation, it is necessary to make the in-coming trains synchronous with one another. These trains are, indeed, generally only asynchronous, that is, they have a same rated pulse rate but are controlled by independent clocks, which are not synchronized in relation to one another; their pulse rate cannot therefore be strictly equal. These asynchronous trains are therefore synchronized, all being brought to a same pulse rate slightly more rapid than that which each of them can have. This difference in rate is compensated by the incorporating, in each train, of extra bits, called justification bits or stuffing bits.

On receiving of the out-going channel, a demultiplexer must be able to recognize, in the multiplex (or rapid) train, the justification bits inherent to each one of the in-coming channels and extract them therefrom, in order to able to restore correctly the slow trains. To do this, the justification bits take up, in the multiplex train, quite precise positions and it is necessary to insert, at locations which are also determined, data called "justification indicator data" which make it possible to know if a justification has been effected.

The multiplex train which is at a pulse rate slightly higher than n times the highest pulse rate which the slow trains may have, is articulated, generally, in successive frames, characterized by a particular and repetitive signal, called the frame locking word and composed of a set of ordinated binary elements whose number is definite. Each frame comprises:

Binary elements containing the data to be transmitted, coming from the slow trains; these binary elements will be called "informative bits":

Filling binary elements which comprise:

Systematic binary insertion elements formed by:

The frame locking word with, contingently, service bits and the whole will be designated as the frame beginning "identification character";

The justification indicators inherent to each of the incoming channels;

The contingent justifications for the various in-coming channels.

In known multiplexing systems, $n$ channel elements each receive a slow digital train and set them in synchronism by the adding of justification bits; a multiplexing element sends out, from these synchronized trains, the multiplexed train. The channel elements comprise means for effecting the necessary justifications in the slow trains and inserting the justification indicator bits in the synchronized trains so that these latter, which reach the multiplexing element, be ready to be multiplexed, binary element by binary element (interlacing). To do this, it is necessary for each of the channel elements to receive from the multiplexing element, data concerning the pulse rate of the multiplex train, the frame frequency, the location of the binary justification elements and the location of the binary justification indicator elements assigned to the corresponding in-coming channel.

In such an equipment, the number of connections between the channel elements and the multiplexing element is therefore great, this making wiring difficult for a high in-coming rhythm and a great number of in-coming channels.

SUMMARY OF THE INVENTION

The aim of the present invention is to reduce this number of connections and hence to widen the multiplexing possibilities. A device according to the invention comprises also, channel elements connected with a multiplexing element, but, to reach the aim of the invention, the means implemented in these two types of elements are different from those used previously. According to the invention, each of the channel elements transmits, to the multiplexing element, a justification request signal incorporated in the synchronized train at a determined location; that signal, read by the multiplexing element, will cause this latter to insert in the multiplex train the justification indicator bits and to give to the corresponding channel element the permission to effect a justification.

The present invention has as its object a device for multiplexing n asynchronous digital trains having individual pulse rate $Ri$ ($i = 1, \ldots, n$) into a more rapid digital train sent out at a pulse rate R and articulated in successive frames comprising, at determined locations, an identification character, at least one set of $n$ justification indicator bits and at the most one justification bit per incident train, comprising $n$ channel elements and a multiplexing element comprising, more particularly, a multiplexing circuit for sending out the rapid train and means for generating, from the said pulse rate R, a clock HL sent out at a pulse rate R' equal to the $n^{th}$ of R and having "holes" at the locations corresponding to the systematic filling bits and a frame synchronizing signal S, each of the channel elements comprising an inhibition circuit for the clock HL, a memorizing assembly operating in the buffer mode, controlled for writing by a clock having a pulse rate $Ri$ and for reading by the output $HLi$ of the said inhibition circuit, to make the digital train entering at the pulse rate $Ri$ transit and to send it out at the pulse rate R', a phase comparator between the clock $HLi$ and the clock at the pulse rate $Ri$, and a justification order circuit to validate the result of that comparison from the first signal S occurring and, if this result requires it, generate a control signal for the said inhibition circuit, characterized in that each of the said channel elements comprises means for inserting in the out-going train of the memorization assembly, during the signal S, a justification request signal which is a function of the said validated result, the digital train emerging from the said means being sent on the multiplexing circuit, and in that the multiplexing element comprises means for reading each of the n justification request signals, the said reading means controlling the said multiplexing circuit for the inserting of the justification indicator bits in the rapid train, and means for generating, as a function of the result of the said reading, justification permission signals for controlling the said corresponding justification order circuits.

Other characteristics and advantages of the invention will become apparent from the following description of an example of an embodiment given hereinbelow. For clearness' sake in the description, an assembly comprising four in-coming channels, having a rated rhythm of 2.048 M bits/s will be examined; the multiplex train, has in these conditions, a rhythm of 8.488 M bits/s.

BRIEF DESCRIPTION OF THE DRAWINGS

The description is given with reference to the accompanying drawings in which:

FIG. 5, including FIGS. A through L, shows a time-diagram.

DESCRIPTION OF A PREFERRED EMBODIMENT

In the various figures, the same references will represent the same elements.

Figure 1:
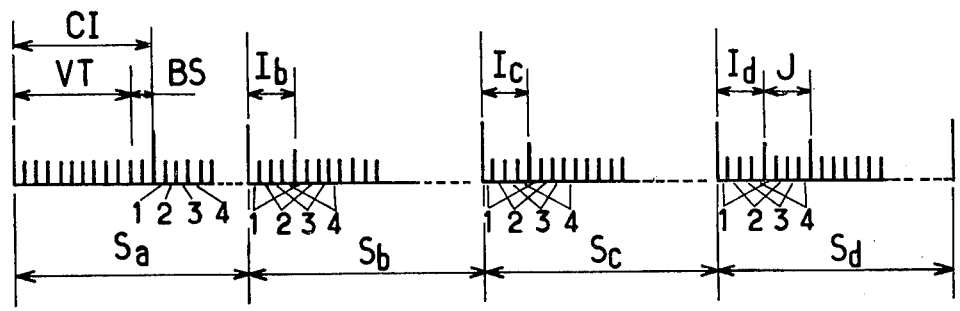
FIG. 1 shows the (standardized) structure of a frame in a multiplex train at 8.448 M bits/s.

FIG. 1 shows the general frame of a multiplex train having 8.448 M bits/s coming from four component trains having 2.048 M bits/s. It numbers 848 binary elements and is divided into four sectors, Sa to Sd, each having 212 binary elements. The first sector Sa begins by ten frame locking bits VT, followed by two service bits BS, these twelve bits forming an identification character word CI. The sectors Sb, Sc and Sd each begin by a group Ib, Ic and Id respectively, having four justification indicator bits, the first bit of each of these groups belonging to a first component train, the second bit belonging to a second component train, etc. . . , this being apparent from FIG. 1 with the indications 1, 2, 3, 4 situated above the positions of the binary elements.

When there are any justifications bits, they take up the four bit locations, forming a group J, which follow the locations of the justification indicator bits of the fourth sector Sd; the first location of J being assigned to the first component train, the second location being assigned to the second component train, etc. . . There is thus at the most one justification bit per frame and per in-coming channel. When, in a given frame, one (or several) in-coming channel(s) has no justification bit, the location assigned to that channel in the group J is taken up by an informative bit coming from the corresponding in-coming train.

The first sector Sa comprises therefore 200 informing bits, that is, 50 per in-coming channel, the sector Sb and Sc each comprise 208, that is, 52 per in-coming channel and for the fourth sector Sd, that number varies between 204 and 208 according to the frames, that is, 51 to 52 per in-coming channel.

Figure 2:
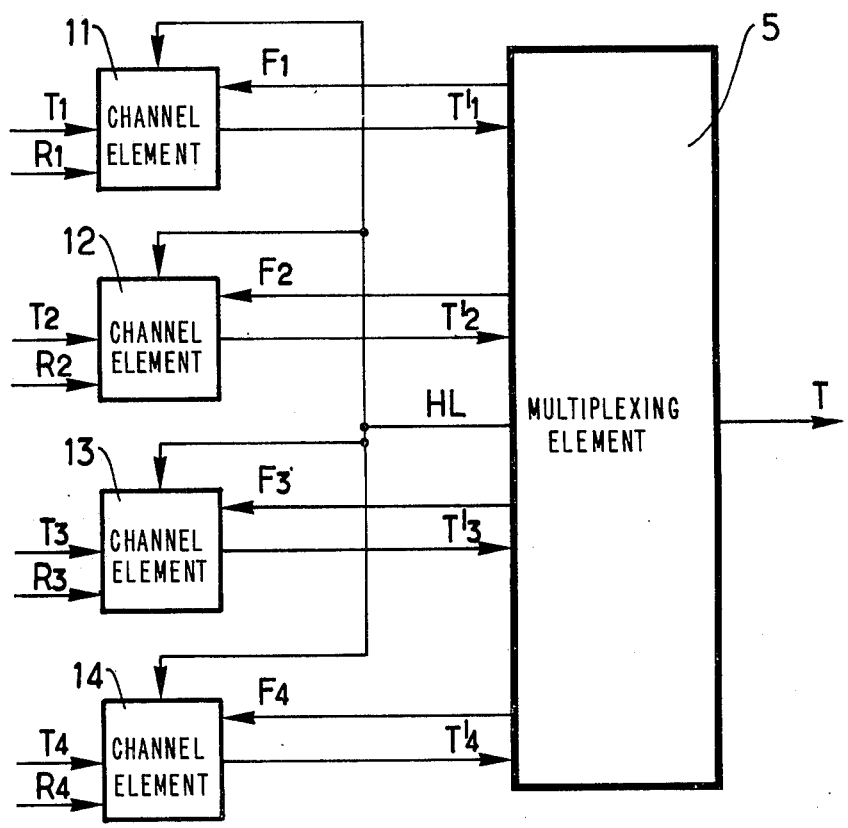
FIG. 2 shows a diagram of a device according to the invention.

In FIG. 2, four asynchronous digital trains, T1 to T4, whose respective pulse rate are R1 to R4 having a rated value of 2.048 M bits/s, reach respectively, four channel elements 11, 12, 13, 14 which receive, moreover, the pulse rate R1 to R4 respectively. A multiplexing element 5 sends out a train T, which is a multiplex of the trains T1, T2, T3 and T4, at a rhythm of 8.448 M bits/s. The multiplexing element 5 sends to the channel elements 11 to 14 a group of signals, F1 to F4 respectively, as well as a signal HL.

Each of the signals F1 to F4 is a compound signal containing a frame synchronization signal and, when a justification is necessary for the corresponding channel, a justification signal. The signal HL, is obtained from a clock pulse having a pulse rate R' of 2.112 M bits/s, that is, a quarter of 8.448 M bits/s, in which the pulses corresponding to the identification character and justification indicator binary elements have been deleted. The twelve identification character bits in the multiplex train T having a pulse rate of R correspond to three R' clock pulses; likewise, the three groups Ib, Ic, Id having four justification indicator bits (FIG. 1) each correspond to one R' clock pulse. The clock HL, therefore comprises a "hole" of three pulses at the beginning of a frame and a "hole" of one pulse at the beginning of the second, third and fourth sectors of the frame.

The channel elements 11 to 14 send to the multiplexing element 5 digital trains T'1 to T'4, respectively obtained by the synchronizing of the trains T1 to T4, and which have a pulse rate of R'. At the location of the identification character, a justification request signal is inserted in each of the trains T'1 to T'4.

Figure 3:
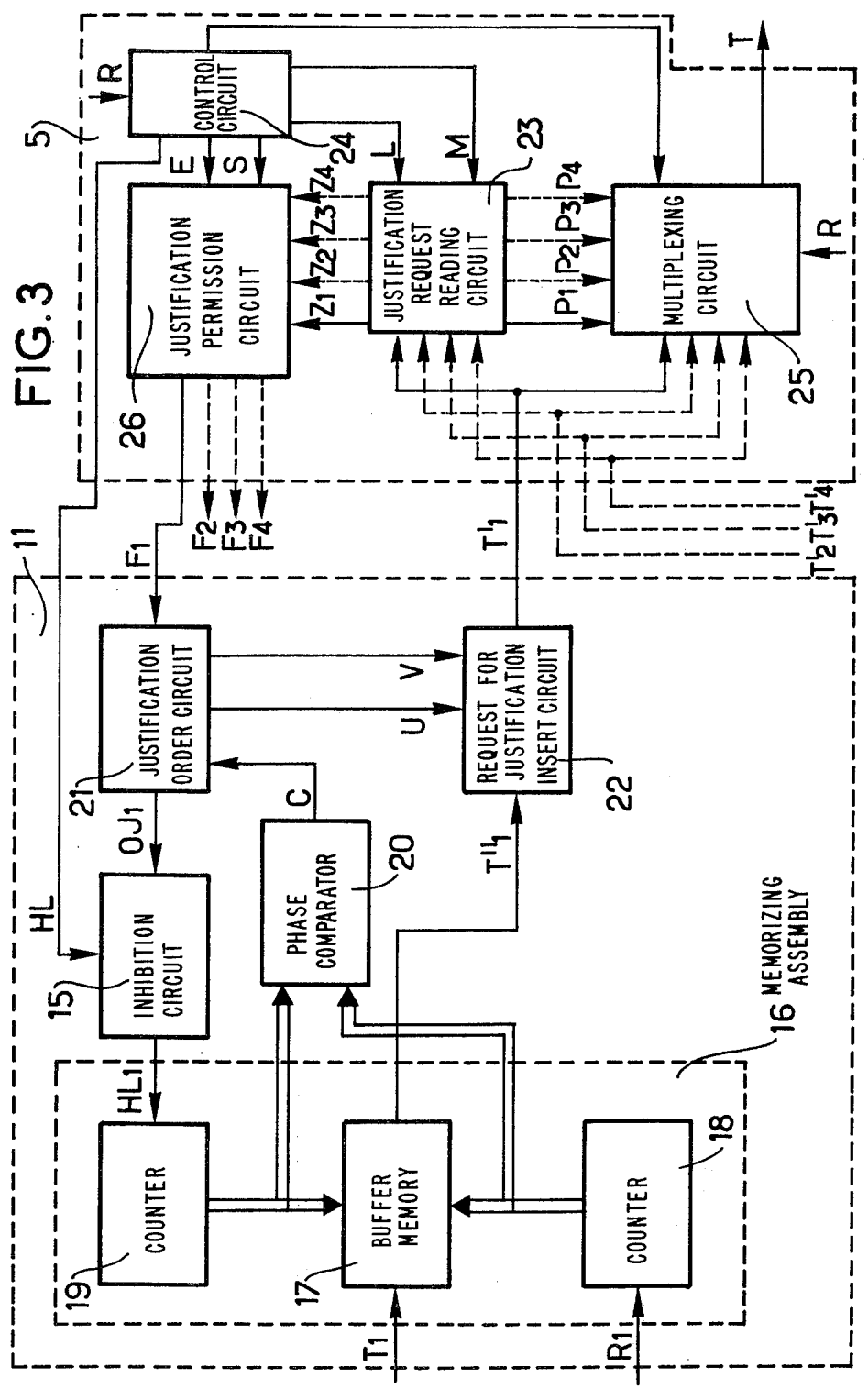
FIG. 3 shows a channel element connected with the multiplexing element, for the device according to FIG. 2.

FIG. 3 shows the detailed structure of a channel element, the element 11 being taken by way of an example, as well as that of the mutliplexing element 5.

The channel 11 comprises a circuit 15 receiving, on a first input, the clock pulse HL and on a second input, a justification order signal OJ1 whose function is to inhibit a pulse of the clock HL when a justification is necessary. A clock HL1 emerges from the circuit 15. A memorizing assembly 16 receiving the train T1 and controlled, for writing, by the clock R1 and for reading by the clock HL1, has the function of sending out a train T''1 which runs at the pulse rate of R', the "holes" appearing in the reading clock HL1 becoming apparent in the train T''1 by a repetition of the preceding informative bit.

The producing of such a memorizing assembly by means of a buffer memory 17 receiving the train T1 and constituted by a group of flip-flops and a group of logic gates, by a writing control circuit of the memory receiving the clock pulse R1, and by a reading control circuit of the memory receiving the clock pulse HL1, the circuits 18 and 19 being constituted by Johnson counters, is known.

To take into account the tolerance on the rated pulse rate of the in-coming channels and also a contingent unput jitter effect, Johnson modulo 8 counters which supply, on eight outputs, eight signals (symbolized by a double line) shifted in time at the frequency of the control clock, that is, at the pulse rate R1 for the counter 18 and at the pulse rate of HL1 for the counter 19, are used to great advantage. Writing advance signals will be mentioned with respect to the counter 18 and reading advance signals will be mentioned with respect to the counter 19.

The operation of such an assembly is referred to again. The flip-flops of the buffer memory 17, which are eight in number, of type D, each receive the train T1 on their input D and are controlled by the eight outputs of the counter 18. This enables them to register the first then the ninth, then the seventeenth bit . . . of a sequence of the train T1 in the first flip-flop, the second, the tenth, the eighteenth . . . in the second flip-flop, etc, the data being preserved, each time, for eight clock intervals. A series-parallel transformation is thus effected. An AND gate, controlled by one of the eight output signals of the counter 19 is associated with each flip-flop. These gates give, at the output, the value assumed by the flip-flop with which they are each connected, during an interval of time defined by the counter 19. All the reading signals are brought together by an OR function which effects a parallel-series transformation and gives, at the output, the digital train T"1.

A phase comparator 20 between the clocks R1 and HL1 receives, on a first group of inputs, the output signals of the counter 18 and, on a second group of inputs, the output signals of the counter 19. That comparator, of known type, makes it possible to detect any overlapping between a writing advance signal energizing a certain flip-flop of the memory 17 and the reading advance signal energizing the gate connected with the said flip-flop.

The output signal C of the comparator 20 is applied to a justification order circuit 21 which receives, moreover, the signal F1 and emits on a first output the signal 0J1, on a second and third output, signals U and V respectively, which are sent to a circuit 22 for the inserting of a request for justification. The circuit 22 receives, moreover, the train T"1 and sends out the train T'1. The circuits 21 and 22 and the signals U and V will be described with reference to FIG. 4.

The multiplexing element 5 comprises a cicuit 23 for reading the justification request signals, a circuit 24 for generating control signals, a circuit 26 for generating signals F1 to F4 and a multiplexing circuit 25. The signals which concern only the channels 2, 3 and 4 have been shown in discontinuous lines. The circuit 23 receives, on a first group of inputs, the trains T'1 to T'4 and on a second group of inputs, synchronizing signals L and M coming from the circuit 24 which receives, on its part, the pulse rate R and sends out the clock pulse HL. The circuit 26 generates the signals F1 to F4 from a first group of four signals Z1 to Z4 sent out by the circuit 23 and from data coming from the circuit 24 and concerning on the one hand, the frame synchronizing and on the other hand, the location of the justifications. A second group of four signals P1 to P4 coming from the circuit 23 is sent on the multiplexing circuit 25 which receives, moreover, the trains T"1 to T"4 as well as the rhythm R and a data item on the frame frequency coming from the circuit 24. The multiplex train T is sent out by the multiplexing circuit 25.

The signals L, M, Z1 and P1 will be described with reference to FIGS. 4 and 5. The signals Z2 to Z4 are evidently similar to the signal Z1 and the signals P2 to P4 are evidently similar to the signal P1.

Figure 4:
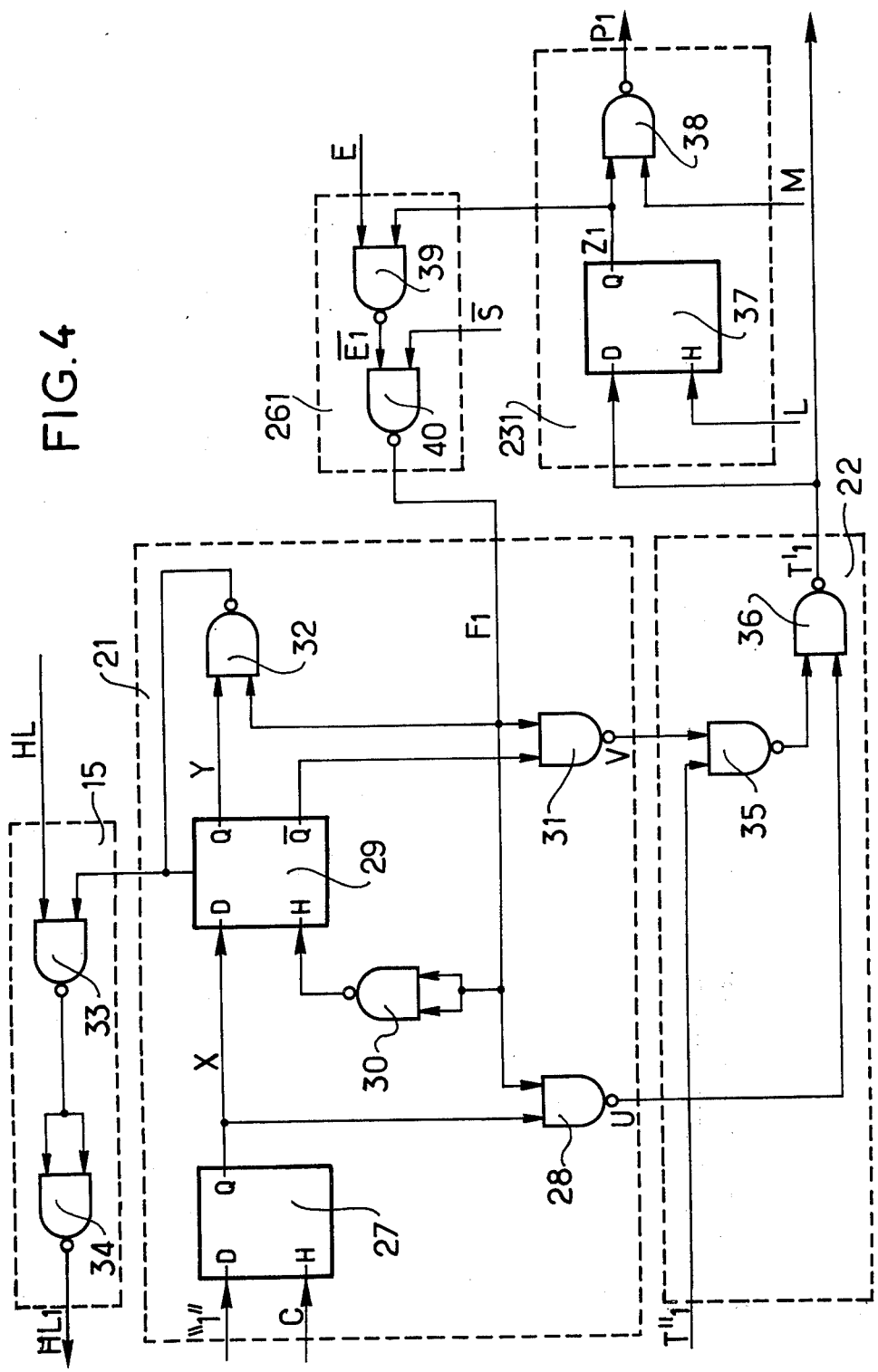
FIG. 4 shows in detail a part of the device according to FIGS. 2 and 3.

FIG. 4 shows in detail the circuits 15, 21 and 22 of the channel element 11 as well as a circuit 231 corresponding to the part of the circuit 23 which concerns the channel 1 and a circuit 261 for generating the signal F1 and forming a part of the circuit 26. The signals F2, F3 and F4 are, of course, generated by means of circuits identical to the circuit 261 and the circuit 23 comprises, for each of the channels, a circuit identical to the circuit 231. The multiplexing circuit 25 and the circuit 24, which are manufactured in a known way, will not be described in detail.

The justification order circuit 21 comprises a first flip-flop 27, of type D, receiving permanently a logic "1" at its input D and whose clock input is connected to the output signal C of the phase comparator 20 (FIG. 3). The direct output Q of the flip-flop 27 which sends out a signal X is connected on the one hand to a first input of a first NAND gate 28, which receives on a second input the signal F1 and on the other hand to input D of a second flip-flop 29 of type D, which receives, on its clock input, the signal F1 inverted by a second NAND gate 30. The inverse output Q of the flip-flop 29 energizes a third NAND gate 31, which receives, moreover the signal F1; its direct output Q which sends out a signal Y is connected to a first input of a fourth NAND gate 32, the signal F1 arriving on a second input of this gate. The output of the gate 32 controls the resetting to zero of the flip-flop 29.

The inhibition circuit 15 of HL is constituted by a first NAND gate 33, receiving on the one hand, the clock HL and on the other hand, the output signal of the gate 32 and by an inverter 34 which inverts the output signal of the gate 33 and sends out the signal HL1.

The circuit 22 for the insertion of the justification request signal comprises a first NAND gate 35, receiving, on the one hand, the digital train T"1 and, on the other hand, the output signal V of the gate 31, the output of the gate 35 being connected up to an input of a second NAND gate 36, a second of whose inputs receives the output signal U to the gate 28. The gate 36 sends out the train T'1.

The circuit 231 for the reading of the justification request signal comprises a flip-flop 37 of type D, receiving, at its input D, the train T'1 and being synchronized by the signal L, generated by the circuit 24 and which is at the frame frequency. The signal L will be described with reference to FIG. 5. The direct output Q of the flip-flop 37 which sends out the signal Z1 energizes a NAND gate 38, which receives, moreover, from the circuit 24, the signal M; this latter signal is at the frame frequency and comprises, in a period, three pulses situated at the three locations of the justification indicators. The output signal P1 of the gate 38 is sent towards the multiplexing circuit 25 and enables the inserting, in the multiplex train T, of the justification indicator bits inherent to the channel 1.

The circuit 261 generates the signal F1 from a signal S for the synchronization of the frame and from a signal E for the location of the justification; both are generated in the circuit 24, are at the frame frequency and are situated at the instants provided in the multiplex train for, respectively, the identification character word and the group of contingent justification bits. The circuit 261 is constituted by a first NAND gate 39 receiving on the one hand, the signal Z1 and on the other hand, the signal E and by a second NAND gate 40, which sends out the signal F1 from the output signal E1, of the gate 39 and of the signal S complemented, the signal E1 constituting the justification permission signal (for the channel 1).

FIG. 5 represents a diagram of the periods relating to the principal signals appearing in FIG. 4, these signals being represented for a frame comprising a justification, followed, by way of an example, by a frame having no justification.

The clock pulse HL which comprises, at the beginning of the first frame, a "hole" $t$ of three pulses corresponding to the identification character word and three "holes", $t1$, $t2$ and $t3$ of one pulse each, corresponding respectively to the groups $Ib$, $Ic$ and $Id$ of justification indicator bits, is shown at $a$. For the second frame, only a "hole" $t'$, similar to $t$ and a "hole" $t'3$, similar to $t3$, have been shown.

The signal C emerging from the phase comparator 20 is shown at $b$ and the direct output signal X of the flip-flop 27 is shown at $c$. The flip-flop 27 being in the state "0", the appearance of a comparison signal sets it in the state "1", that appearance occuring when there is an overlapping of a writing advance signal, coming from the counter 18, with the corresponding reading advance signal, coming from the counter 19. The compound signal F1 which appears at d comprises a first synchronization pulse situated during the hole $t$ and corresponding to the signal S, and a second pulse situated immediately after the "hole" $t3$ and corresponding to the justification permission signal E1.

The direct output signal Y of the flip-flop 29, the output signal U of the gate 28, the output signal V of the gate 31 and the digital train T'1, appear respectively at $e$, $f$, $g$ and $h$, the sign $\phi$ indicating that the corresponding bits may be "0" or "1".

The result of the phase comparison, memorized in the flip-flop 27, is validated by the signal S which, throughout its duration, cancels the signal U, this forcing the output of the gate 36 into the state "1". The train T'1 thus comprises a "1", throughout the duration of the signal S when a justification proves to be necessary. Basing itself on the reading signal L, shown at $i$, which is similar to the signal S but slightly shifted in time, the flip-flop 37 memorizes the said "1" of the train T'1 which represents a request for justification; this is what the signal Z1 appearing at $j$ shows. The signal S, throughout its duration, also cancels the signal V and, on its trailing edge, makes the flip-flop 29 change over from the state "0" to the state "1", this being shown by an arrow in FIG. 5.

The request for justification validates the justification location signal E shown at $k$, this resulting in F1, in the justification permission pulse E1. That pulse, which cancels the signals X and Y respectively on its leading edge and on its trailing edge inhibits the pulse of HL which follows $t3$, thus enabling the memorizing assembly, controlled by the clock pulse HL1 shown at 1, to effect the justification.

For the following frame, no comparison signal having appeared before the signal S, the signals X and Y remain at zero and the signal U is preserved. Throughout the duration of the signal S, the signal V is cancelled, forcing the output of the gate 35 into the state "1" and subsequently forcing that of the gate 36 into the state "0". The digital train T'1 therefore comprises an "0" throughout the duration of the signal S; there is no request for justification. In these conditions, the reading signal L cancels, on its leading edge, the signal Z1, this inhibiting the signal E. The signal F1 therefore does not comprise any justification permission pulse and the clock HL1 is identical to the clock HL.

The present invention has been described with reference to an embodiment chosen by way of an example. It is evident that details may be modified therein and/or that certain means may be replaced by other technically equivalent means therein. The invention is, of course, not limited to the particular application (multiplexing of four digital trains having 2.048 M bits/s) which it has been chosen to describe and applies more particularly to the multiplexing of a greater number of channels having a higher output rate.

I claim:

1. Device for multiplexing n incident quasisynchronous digital trains T$l$ to T$n$ having individual pulse rates R$l$ to R$n$ respectively into a more rapid digital train sent out at a pulse rate R and articulated in successive frames each including, at determined locations, at the most one justification bit per incident train, and systematic filling bits comprising an identification character and at least one set of $n$ justification indicator bits for the n incident trains respectively, comprising:

n channel elements for receiving the $n$ incident trains respectively, and a multiplexing element including a multiplexing circuit for sending out the rapid train, and first means for generating, from the said pulse rate R, a clock signal HL sent out at a pulse rate R' equal to R/n and having "holes" at the locations corresponding to the systematic filling bits, a frame synchronizing signal S formed by pulses occuring within the time intervals corresponding to the locations of said identification characters in said successive frames, and a justification location signal defining the locations allocated in said successive frames for the justification bits, each of said channel elements, which receives an incident train T$i$ ($i = 1, \ldots, n$), including second means connected to receive the clock signal HL and generating, under the control of a control signal applied thereto, additional "holes" in said clock signal HL, in the locations corresponding to the justifications bits, said circuit sending out a clock signal HL$i$, buffer means receiving said train T$i$, controlled for load by a clock signal having the pulse rate R$i$ and for unload by said clock signal HL$i$, and sending out a digital train T"$i$, a phase comparator for comparing the phase of said clock signal HL$i$ and the phase of said clock signal at the pulse rate R$i$, third means connected to the output of said phase comparator and connected to receive said signal S, for generating a signal representing the result of the phase comparison at each pulse of said signal S, fourth means controlled by said third means for inserting in the outgoing train T"$i$ of said buffer means, within the duration of each pulse of said signal S, a justification request signal which is a function of said signal representing the result of the phase comparison, the digital train emerging from the said fourth means being sent to the multiplexing circuit, said multiplexing element further including fifth means for reading each of the $n$ justification request signals, the fifth means controlling the said multiplexing circuit for the inserting of the justification indicator bits in the rapid train, and sixth means for generating from the said justification location signal and as a function of the result of the said reading, $n$ justification permission signals for the said $n$ incident trains respectively, each of said $n$ justification permission signals being sent to the corresponding channel element wherein this justification permission signal is applied for controlling said second means.

2. Device according to claim 1, wherein said multiplexing element further comprises, means for effecting the logic sum of each of the said justification permission signals with the synchronization signal S, each of the said channel elements receiving the said corresponding justification permission signal and the said signal S in the form of a compound signal transmitted from the multiplexing element on a single wire.

* * * * *

UNITED STATES PATENT AND TRADEMARK OFFICE
CERTIFICATE OF CORRECTION

PATENT NO. : 4,002,844
DATED : Jan. 11, 1977
INVENTOR(S) : Doussoux

It is certified that error appears in the above-identified patent and that said Letters Patent are hereby corrected as shown below:

IN THE TITLE:

Line 2 of the title delete "ASYNCHRONOUS" insert --PLESIOCHRONOUS--

IN THE ABSTRACT:

Lines 4 & 6, delete "asynchronous" insert --plesiochronous--

IN THE SPECIFICATION:

Col. 1, lines 16-17 & 20, delete "asynchronous" insert --plesiochronous--
Col. 2, line 27, delete "asynchronous" insert --plesiochronous--
Col. 3, line 56, delete "asynchronous" insert --plesiochronous--
Col. 5, line 41, delete "rhythm" insert --pulse rate--

IN THE CLAIMS:
Col. 7:
Claim 1, lines 61-62, delete "quasisynchronous" insert --plesiochronous--

Signed and Sealed this

Thirty-first Day of May 1977

[SEAL]

Attest:

RUTH C. MASON
Attesting Officer

C. MARSHALL DANN
Commissioner of Patents and Trademarks